US008594817B2

(12) United States Patent
Oh et al.

(10) Patent No.: US 8,594,817 B2
(45) Date of Patent: Nov. 26, 2013

(54) METHOD AND AN APPARATUS FOR PROCESSING AN AUDIO SIGNAL

(75) Inventors: Hyen-O Oh, Seoul (KR); Yang Won Jung, Seoul (KR); Chirstof Faller, St-Sulpice (CH)

(73) Assignee: LG Electronics Inc., Seoul (KR)

( * ) Notice: Subject to any disclaimer, the term of this patent is extended or adjusted under 35 U.S.C. 154(b) by 187 days.

(21) Appl. No.: 12/530,615

(22) PCT Filed: Mar. 7, 2008

(86) PCT No.: PCT/KR2008/001312
§ 371 (c)(1),
(2), (4) Date: Mar. 5, 2010

(87) PCT Pub. No.: WO2008/111770
PCT Pub. Date: Sep. 18, 2008

(65) Prior Publication Data

US 2010/0189266 A1 Jul. 29, 2010

Related U.S. Application Data

(60) Provisional application No. 60/894,162, filed on Mar. 9, 2007, provisional application No. 60/942,967, filed on Jun. 8, 2007, provisional application No. 60/943,268, filed on Jun. 11, 2007.

(30) Foreign Application Priority Data

Mar. 6, 2008 (KR) ........................ 10-2008-0021120
Mar. 6, 2008 (KR) ........................ 10-2008-0021121

(51) Int. Cl.
*G06F 17/00* (2006.01)
*H04B 1/00* (2006.01)

(52) U.S. Cl.
USPC ............................................ 700/94; 381/119

(58) Field of Classification Search
USPC .......................................................... 700/94
See application file for complete search history.

(56) References Cited

U.S. PATENT DOCUMENTS 3,783,192 A 1/1974 Takahashi
4,251,688 A 2/1981 Furner
(Continued)

FOREIGN PATENT DOCUMENTS

AU 2007328614 A1 6/2008
AU 2008295723 B2 3/2009
(Continued)

OTHER PUBLICATIONS

Faller, "Parametric Joint-Coding of Audio Sources", AES 120th Convention, vol. 2, May 20, 2006, pp. 1-12.*
(Continued)

*Primary Examiner* — Joseph Saunders, Jr.
(74) *Attorney, Agent, or Firm* — Birch, Stewart, Kolasch & Birch, LLP

(57) ABSTRACT

A method of processing an audio signal is disclosed. The present invention comprises receiving a downmix signal, object information and preset information, generating downmix processing information using the object information and the preset information, processing the downmix signal using the downmix processing information, and generating multichannel information using the object information and the preset information, wherein the preset information is extracted from a bitstream. Accordingly, a gain and panning of an object can be easily controlled without user's setting for each object using preset information set in advance. And, a gain and panning of an object can be controlled using preset information modified based on a selection made by a user.

14 Claims, 18 Drawing Sheets

(56) References Cited

U.S. PATENT DOCUMENTS

| | | | |
|---|---|---|---|
| 6,026,168 | A | 2/2000 | Li et al. |
| 6,496,584 | B2 | 12/2002 | Irwan et al. |
| 6,952,677 | B1 | 10/2005 | Absar et al. |
| 7,103,187 | B1 | 9/2006 | Neuman |
| 2001/0055398 | A1 | 12/2001 | Pachet et al. |
| 2002/0136414 | A1 | 9/2002 | Jordan et al. |
| 2003/0026441 | A1* | 2/2003 | Faller .............................. 381/98 |
| 2005/0078831 | A1 | 4/2005 | Irwan et al. |
| 2005/0089181 | A1 | 4/2005 | Polk |
| 2005/0271215 | A1 | 12/2005 | Kulkarni |
| 2006/0115100 | A1 | 6/2006 | Faller |
| 2006/0174267 | A1 | 8/2006 | Schmidt |
| 2007/0165869 | A1 | 7/2007 | Ojanpera |
| 2007/0183617 | A1 | 8/2007 | Yokota et al. |
| 2007/0213990 | A1* | 9/2007 | Moon et al. ................... 704/500 |
| 2007/0255572 | A1 | 11/2007 | Miyasaka et al. |
| 2009/0252339 | A1 | 10/2009 | Obata et al. |
| 2010/0174548 | A1 | 7/2010 | Beack et al. |
| 2011/0013790 | A1 | 1/2011 | Hilpert et al. |
| 2011/0022402 | A1 | 1/2011 | Engdegard et al. |

FOREIGN PATENT DOCUMENTS

| | | | |
|---|---|---|---|
| CN | 101529501 | A | 9/2009 |
| EP | 1 691 348 | A1 | 8/2006 |
| EP | 2 083 584 | A1 | 7/2009 |
| JP | 51-92101 | A | 7/1976 |
| JP | 3-163997 | A | 7/1991 |
| JP | 09-046799 | A | 2/1997 |
| JP | 9-200897 | A | 7/1997 |
| JP | 2001-503581 | A | 3/2001 |
| JP | 2001-306081 | A | 11/2001 |
| JP | 2002-177452 | A | 6/2002 |
| JP | 2003-263858 | A | 9/2003 |
| JP | 2004-193877 | A | 7/2004 |
| JP | 2005-006018 | A | 1/2005 |
| JP | 2005-512434 | A | 4/2005 |
| JP | 2005-286828 | A | 10/2005 |
| JP | 2005-354695 | A | 12/2005 |
| JP | 2006-3580 | A | 1/2006 |
| JP | 2006-508592 | A | 3/2006 |
| JP | 2006-211206 | A | 8/2006 |
| JP | 2006-217210 | A | 8/2006 |
| JP | 2006-345480 | A | 12/2006 |
| JP | 2007-058930 | A | 3/2007 |
| JP | 2007-67463 | A | 3/2007 |
| JP | 2010-521002 | A | 6/2010 |
| RU | 2005103637 | A | 7/2005 |
| WO | WO 2004/008805 | A1 | 1/2004 |
| WO | WO 2006/022124 | A1 | 3/2006 |
| WO | WO 2006/072270 | A1 | 7/2006 |
| WO | WO 2006/084916 | A2 | 8/2006 |
| WO | WO 2006/126843 | A2 | 11/2006 |
| WO | WO-2006/126844 | A2 | 11/2006 |
| WO | WO-2007/004828 | A2 | 1/2007 |
| WO | WO-2007/004830 | A1 | 1/2007 |
| WO | WO 2007/013775 | A1 | 2/2007 |
| WO | WO 2007/016107 | A2 | 2/2007 |
| WO | WO-2007/027051 | A1 | 3/2007 |
| WO | WO 2007/034806 | A1 | 3/2007 |
| WO | WO 2008/046531 | A1 | 4/2008 |
| WO | WO-2008/069593 | A1 | 6/2008 |

OTHER PUBLICATIONS

"Call for Proposals on Spatial Audio Object Coding", ITU Study Group 16, Video Coding Experts Group, ISO/IEC JTC1/SC29/WG11, MPEG2007/N8853, Jan. 2007, pp. 1-20, Marrakech, Morocco.

Herre et al., "The Reference Model Architecture for MPEG Spatial Audio Coding", Audio Engineering Society Convention Paper 6447, 118th Convention, May 28-31, 2005, pp. 1-13.

J. Herre et al., "The Reference Model Architecture for MPEG Spatial Audio Coding", In: Convention Paper 6447, 118th Convention Audio Engineering Society, Barcelona Spain, May 28-31, 2005, pp. 1-13.

J. Breebaart et al., "Multi-Channel Goes Mobile: MPEG Surround Binaural Rendering", In: AES 29th International Conference Paper, Seoul, Korea, Sep. 2-4, 2006, pp. 1-13.

J. Breebaart et al., "MPEG Spatial Audio Coding / MPEG Surround: Overview and Current Status", In: Convention Paper, 119th convention Audio Engineering Society, New York USA, Oct. 7-10, 2005, pp. 1-17.

Han-Gil Moon et al., "A Multi-Channel Audio Compression Method with Virtual Source Location Information for MPEG-4 SAC", IEEE Transactions on Consumer Electronics, vol. 51, No. 4, Nov. 2005, pp. 1253-1259, II Binaural Cue Coding ' and 'III VLSI Based Sac System.

Christof Faller, "Coding of Spatial Audio Compatible with Different Playback Formats", AES Convention Paper, 117th Convention, San Francisco, CA, Oct. 28-31, 2004, pp. 1-12.

Avendano et al., "Frequency domain techniques for stereo to multichannel upmix," AES 22nd International Conference on Virtual, Synthetic and Entertainment Audio, XP007905188, Jun. 1, 2002, pp. 1-10.

Faller, "Matrix Surround Revisited," AES 30th International Conference, Saariselka, Finland, XP-002496463, Mar. 15, 2007, pp. 1-17.

Jot et al., "Spatial enhancement of audio recordings," AES 23rd International Conference, Copenhagen, Denmark, XP-002401944, May 23, 2003, pp. 1-11.

Faller, C., "Parametric Coding of Spatial Audio," Presentee a la Faculte Informatique et Communications, Institut de systemes de communication, Section des Systemes de Communication, Ecole Polytechnique Federale de Lausanne, Pour L'obtention du Grande de Oocteur es Sciences. These No. 3062., 180 pages, 2004.

Liebchen et al., "Improved Forward-Adaptive Prediction for MPEG-4 Audio Lossless Coding", Audio Engineering Society, Convention Paper, Presented at the 118th Convention, May 28-31, 2005, Barcelona Spain.

Liebchen et al., "The MPEG-4 Audio Lossless Coding (ALS) Standard- Technology and Applications", Audio Engineering Society, Convention Paper, Presented at the 119th Convention, Oct. 7-10, 2006, New York, NY, USA.

Beack et al., "CE on Multichannel sound scene controll for MPEG Surround", ISO.IEC JTC1/SC29/WG11 MPEG2006/M13160, 2006, p. 1-9.

* cited by examiner

METHOD AND AN APPARATUS FOR PROCESSING AN AUDIO SIGNAL

This application is the National Phase of PCT/KR2008/001312 filed on Mar. 7, 2008, which claims priority under 35 U.S.C. 119(e) to U.S. Provisional Application Nos. 60/894,162 filed on Mar. 9, 2007, 60/942,967 filed on Jun. 8, 2007 and 60/943,268 filed on Jun. 11, 2007 and under 35 U.S.C. 119(a) to Patent Application Nos. 10-2008-0021121 filed in Korea on Mar. 6, 2008 and 10-2008-0021120 filed in Korea on Mar. 6, 2008 all of which are hereby expressly incorporated by reference into the present application.

TECHNICAL FIELD

The present invention relates to a method and apparatus for processing an audio signal. Although the present invention is suitable for a wide scope of applications, it is particularly suitable for processing an audio signal received via a digital medium, a broadcast signal or the like.

BACKGROUND ART

Generally, in the process for downmixing an audio signal containing a plurality of objects into a mono or stereo signal, parameters are extracted from each object signal. A decoder may use these parameters. In doing so, panning and gain of each of the objects are controllable by a selection made by a user.

DISCLOSURE OF THE INVENTION

Technical Problem

However, in order to control each object signal, sources included in downmix need to be appropriately positioned or panned. In case of controlling an object by a user, it is inconvenient to control the entire object signals. And, it may be difficult to reproduce an optimal state of an audio signal containing a plurality of objects rather than control it by an expert.

Moreover, in case that object information to reconstruct an object signal is not received from an encoder, it may be difficult to control an object signal contained in a downmix signal.

Technical Solution

Accordingly, the present invention is directed to an apparatus for processing an audio signal and method thereof that substantially obviate one or more of the problems due to limitations and disadvantages of the related art.

An object of the present invention is to provide an apparatus for processing an audio signal and method thereof, by which gain and panning of an object can be controlled using preset information that is set in advance.

Another object of the present invention is to provide an apparatus for processing an audio signal and method thereof, by which preset information set in advance can be transported or stored separate from an audio signal.

Another object of the present invention is to provide an apparatus for processing an audio signal and method thereof, by which gain and panning of an object can be controlled by selecting one of a plurality of previously set preset informations based on a selection made by a user.

Another object of the present invention is to provide an apparatus for processing an audio signal and method thereof, by which gain and panning of an object can be controlled using user preset information inputted from an external environment.

A further object of the present invention is to provide an apparatus for processing an audio signal and method thereof, by which an audio signal can be controlled by generating blind information using a downmix signal if object information is not received from an encoder.

Advantageous Effects

Accordingly, the present invention provides the following effects or advantages.

First of all, gain and panning of an object can be easily controlled without user's setting for each object using preset information set in advance.

Secondly, gain and panning of an object can be controlled using preset information modified based on a selection made by a user.

Thirdly, gain and panning of an object can be easily controlled using a plurality of preset informations set in advance.

Fourthly, gain and panning of an object can be controlled using various kinds of preset informations by using user preset information inputted from an external environment.

Fifthly, gain and panning of an object can be controlled using blind information in case of using an encoder incapable of generating object information.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing an audio signal according to the present invention includes the steps of receiving a downmix signal, object information and preset information, generating downmix processing information using the object information and the preset information, processing the downmix signal using the downmix processing information, and generating multi-channel information using the object information and the preset information, wherein the object information includes at least one selected from the group consisting of object level information, object correlation information and object gain information, wherein the object level information is generated by normalizing an object level corresponding to an object using one of object levels, wherein the object correlation information is generated from a combination of two selected objects, wherein the object gain information is for determining contributiveness of the object for a channel of each downmix signal to generate the downmix signal, and wherein the preset information is extracted from a bitstream.

It is to be understood that both the foregoing general description and the following detailed description are exemplary and explanatory and are intended to provide further explanation of the invention as claimed.

Mode for Invention

Reference will now be made in detail to the preferred embodiments of the present invention, examples of which are illustrated in the accompanying drawings.

In this disclosure, information means a terminology that covers values, parameters, coefficients, elements and the like overall. So, its meaning can be construed different for each case. This does not put limitation on the present invention.

Figure 1:
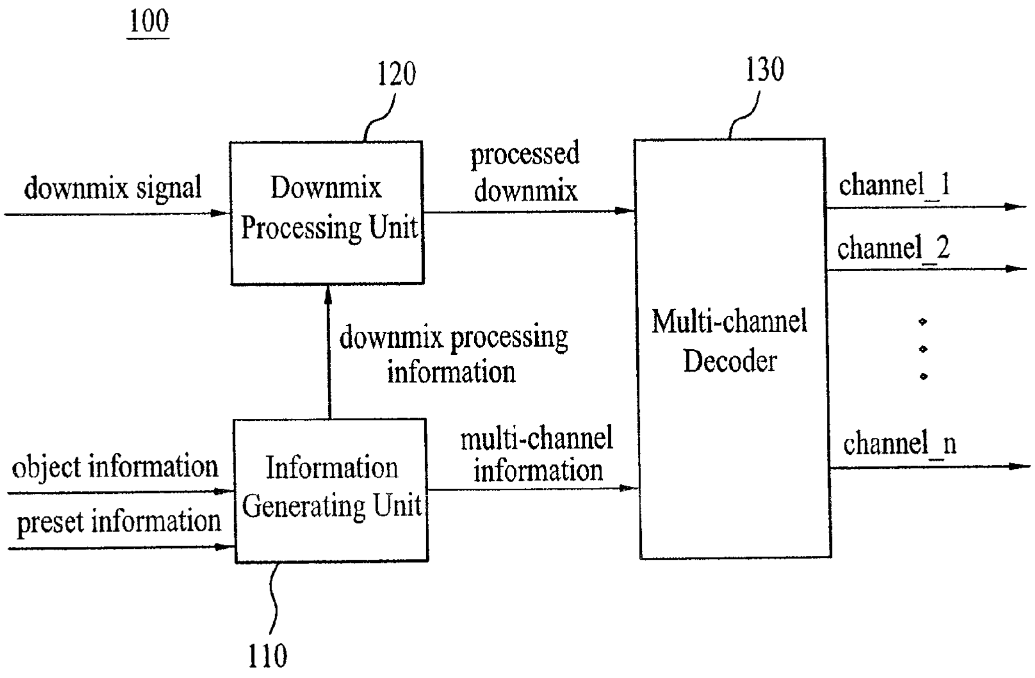
FIG. 1 is a block diagram of an audio signal processing apparatus according to an embodiment of the present invention.

FIG. 1 is a block diagram of an audio signal processing apparatus according to an embodiment of the present invention.

Referring to FIG. 1, an audio signal processing apparatus 100 according to an embodiment of the present invention comprises an information generating unit 110, a downmix processing unit 120, and a multi-channel decoder 130.

The information generating unit 110 receives object information (OI) and preset information (PI) from an audio signal bitstream. In this case, the object information (OI) is the information on objects included within a downmix signal (DMX) and may comprise object level information, object correlation information and the like. The object level information is generated by normalizing an object level using reference information. The reference information may be one of object levels, and more particularly, a highest level among the entire object levels. The object correlation information indicates correlation between two objects and also indicates that two selected objects are signals of different channels of stereo outputs having the same origin. The object gain information indicates a value about contributiveness of object to each channel of downmix signal, and more particularly, a value to modify contributiveness of object.

The preset information (PI) is the information generated based on preset position information, preset gain information, playback configuration information and the like. And, the preset information (PI) is extracted from a bitstream.

The preset position information is the information set to control a position or panning of each object. The preset gain information sets to control a gain of each object and includes a gain factor per object. And, the per-object gain factor may vary according to a time. And, the playback configuration information is the information containing the number of speakers, a position of speaker, ambient information (virtual position of speaker) and the like.

The preset information (PI) designates that object position information, object gain information and playback configuration information corresponding to a specific mode and effect set in advance. For instance, a karaoke mode in the preset information can contain preset gain information rendering a gain of vocal object into ‘0’. And, a stadium mode can contain preset position information and preset gain information to give effect that an audio signal exists within a wide space. An audio signal processing apparatus according to the present invention facilitates a gain or panning of object to be adjusted by selecting a specific mode in preset information (PI) set in advance without user’s adjustment of a gain or panning of each object.

The information generating unit 110 is able to further receive meta information (MTI) (not drawn) on preset information. The meta information (MTI) corresponds to preset information(PI) and may contain a preset information (PI) name, a producer name and the like. In case that there are at least two preset informations (PI), meta information(MTI) on each preset information (PI) can be contained and can be represented in an index form. And, the meta information (MTI) is revealed by a user interface or the like and can be used by receiving a selection command from a user.

The information generating unit 110 generates multi-channel information(MI) using the object information (OI) and the preset information(PI). The multi-channel information (MI) is provided to upmix a downmix signal (DMX) and can comprise channel level information and channel correlation information. And, the information generating unit 110 is able to generate downmix processing information (DPI) using the object information (OI) and the preset information (PI).

The downmix processing unit 120 receives a downmix signal (DMX) and then processes the downmix signal (DMX) using the downmix processing information (DPI). The downmix processing information (DPI) can process the downmix signal(DMX) to adjust a panning or gain of each object signal contained in the downmix signal (DMX).

The multi-channel decoder 130 receives the processed down downmix (PDMX) from the downmix processing unit 120. The multi-channel decoder 130 then generates a multi-channel signal by upmixing the processed downmix signal (PDMX) using the multi-channel information (MI) generated from the information generating unit 110.

Figure 2A:
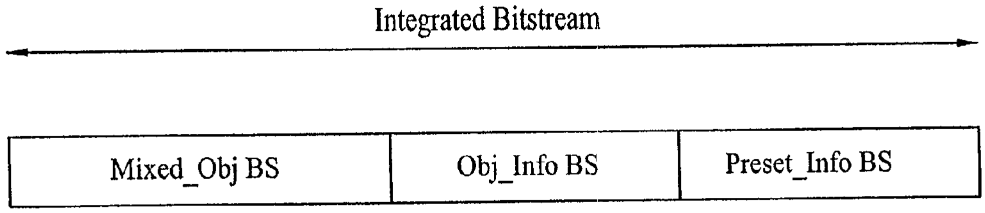
FIG. 2A and FIG. 2B are block diagrams of a bitstream transported to an audio signal processing apparatus according to an embodiment of the present invention.
Figure 2B:
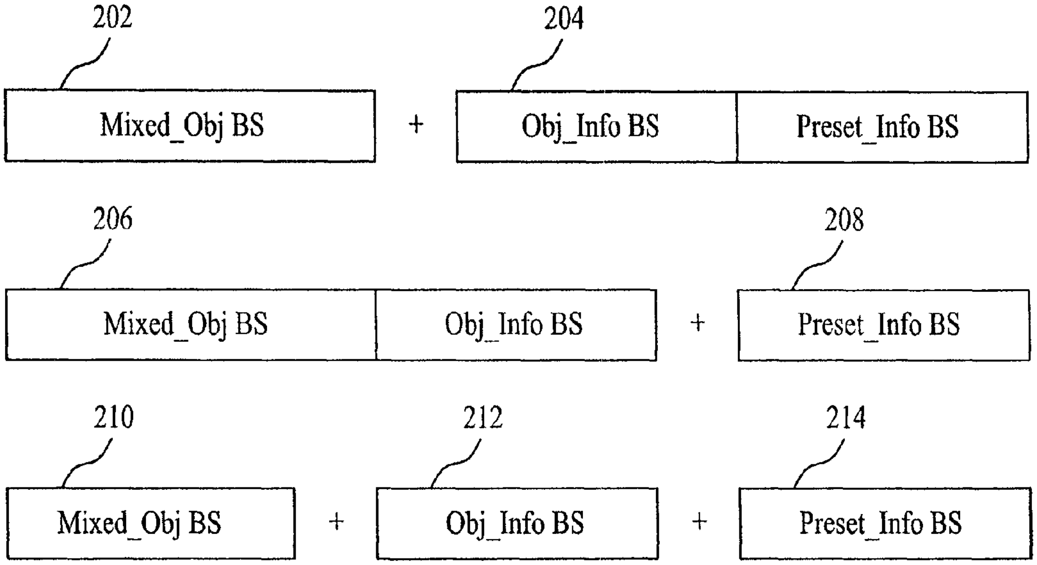

FIG. 2A and FIG. 2B exemplarily show the configurations of a bitstream transported to an audio signal processing apparatus according to an embodiment of the present invention.

Referring to FIG. 2A, in general, a bitstream transported from an encoder is a single integrated bitstream that contains a downmix signal (Mixed_Obj BS), object information (Obj_Info BS) and preset information (Preset_Info BS). And, the object information and the preset information can be stored in a side area or extend area of the downmix signal bit stream. Yet, referring to FIG. 2B, a bitstream according to one embodiment of the present invention can be stored and transported as independent bit sequences in various forms. For instance, the downmix signal (Mixed_Obj) can be carried by a first bitstream 202, and the object information (Obj_Info BS) and the preset information (Preset_Info BS) can be carried by a second bitstream 204. According to another embodiment, the downmix signal (Mixed_Obj BS) and the object information (Obj_Info BS) are carried by a first bit stream 206 and the preset information (Preset_Info BS) can be carried by a separate second bit stream 208 only. According to a further embodiment, the downmix signal (Mixed_Obj BS), the object information (Obj_Info BS) and the preset information (Preset_Info BS) can be carried by three separate bitstreams 210, 212 and 214, respectively.

The first bitstream, the second bitstream or the separate bitstreams can be transported at a same or different bit rate. Particularly, the preset information (Preset_Info BS) (PI) can be stored or transported by being separated from the downmix signal (Mixed_Obj BS) (DMX) or the object information (Obj_Info BS) (OI) after reconstruction of an audio signal.

The audio signal processing apparatus according to the present invention receives user control information (UCI) from a user as well as the preset information transported from an encoder and is then able to adjust a gain or panning of object signal using the user control information(UCI).

Figure 3:
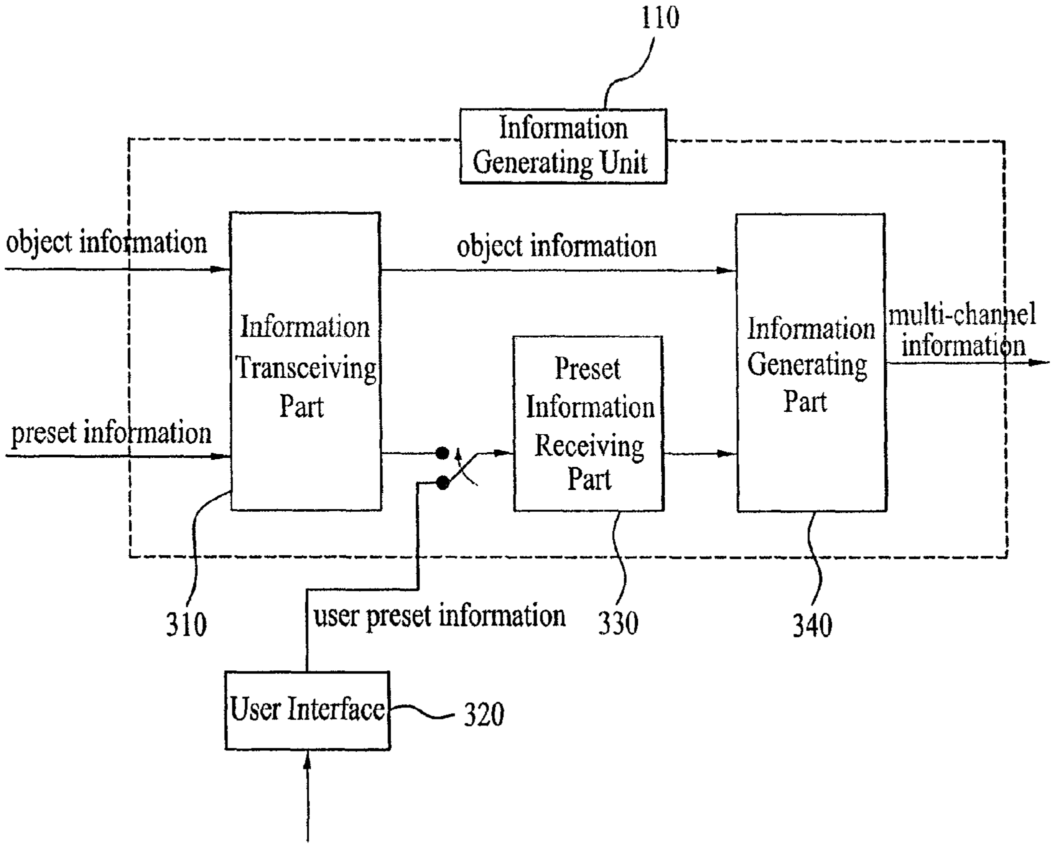
FIG. 3 is a block diagram of an information generating unit of an audio signal processing apparatus according to an embodiment of the present invention.

FIG. 3 is a block diagram of an information generating unit 110 of an audio signal processing apparatus according to an embodiment of the present invention.

Referring to FIG. 3, an information generating unit 110 comprises an information transceiving part 310, a preset information receiving part 330, and an information generating part 340, and further comprises a user interface 320 receiving user control information (UCI).

The information transceiving part 310 receives object information (OI) and preset information (PI) from a bitstream transported from an encoder. Meanwhile, the user interface 320 is able to receive separate user control information (UCI) from a user. In this case, the user control information (UCI) can comprise user preset information (UPI).

The user interface 320 receives the user control information (UCI) to select whether to use the preset information (PI) inputted from the encoder. The preset information receiving part 330 receives the preset information (PI) transported from the encoder or user preset information (UPI) received from a user. If the selection is made not to use the preset information (PI) from the user control information (UCI), the user preset information (UPI) is selected and then inputted to the preset information receiving part 330 to use.

The information generating part 340 is able to generate multi-channel information (MI) using the preset information (PI) or the user preset information (UPI) received from the preset information receiving unit 330 and the object information (OI) received from the information transceiving part 310.

Figure 4:
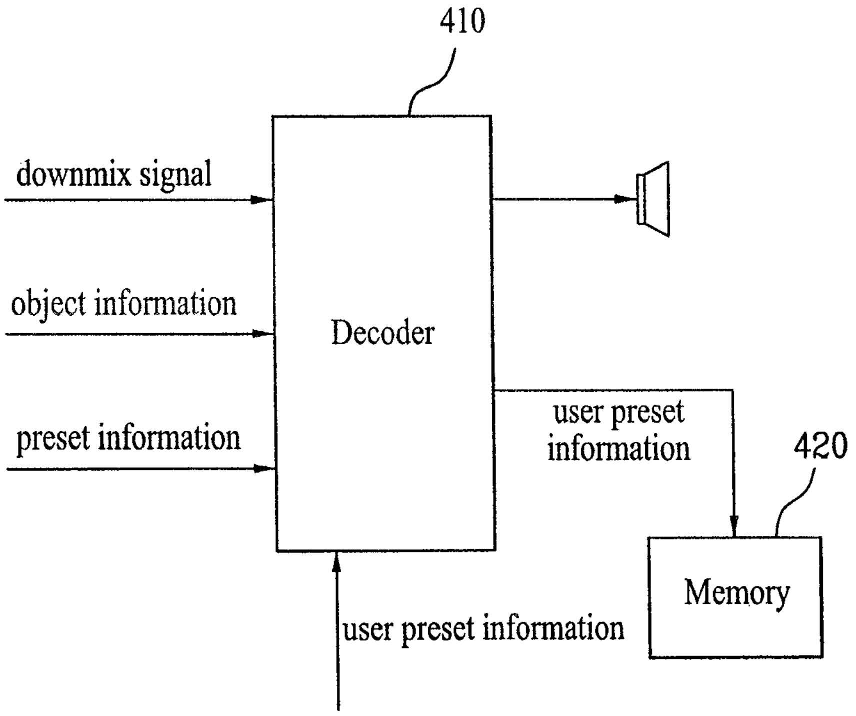
FIG. 4 is a schematic diagram of a bitstream interface of an audio signal processing apparatus including the information generating unit shown in FIG. 3.

FIG. 4 is a schematic diagram of a bitstream interface of an audio signal processing apparatus including the information generating unit shown in FIG. 3. According to one embodiment of the present invention, a bitstream inputted to a decoder 410 contains a downmix signal (DMX), object information (OI), preset information (PI) and user preset information (UPI). And, a bitstream outputted from the decoder can contain a multi-channel signal (MI) and user preset information (UPI). The user preset information is outputted from the decoder 410 and is then able to be stored in a memory 420 to be reused.

A method of generating multi-channel information (MI) using modified preset information (MPI) resulting from modifying a portion of preset information (PI) transported from an encoder using user control information (UCI) inputted from a user interface is explained in detail with reference to FIGS. 5 to 7 as follows.

Figure 5:
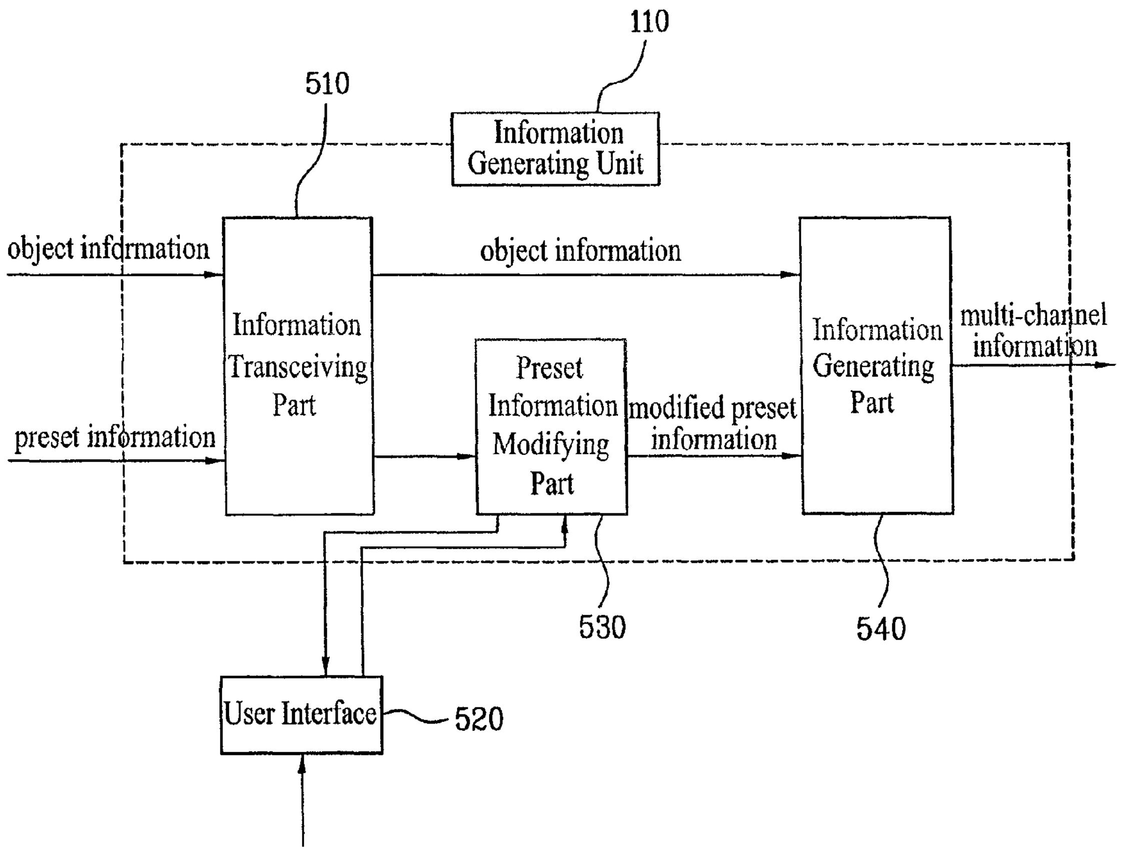
FIG. 5 is a block diagram of an information generating unit of an audio signal processing apparatus according to another embodiment of the present invention.
Figure 6:
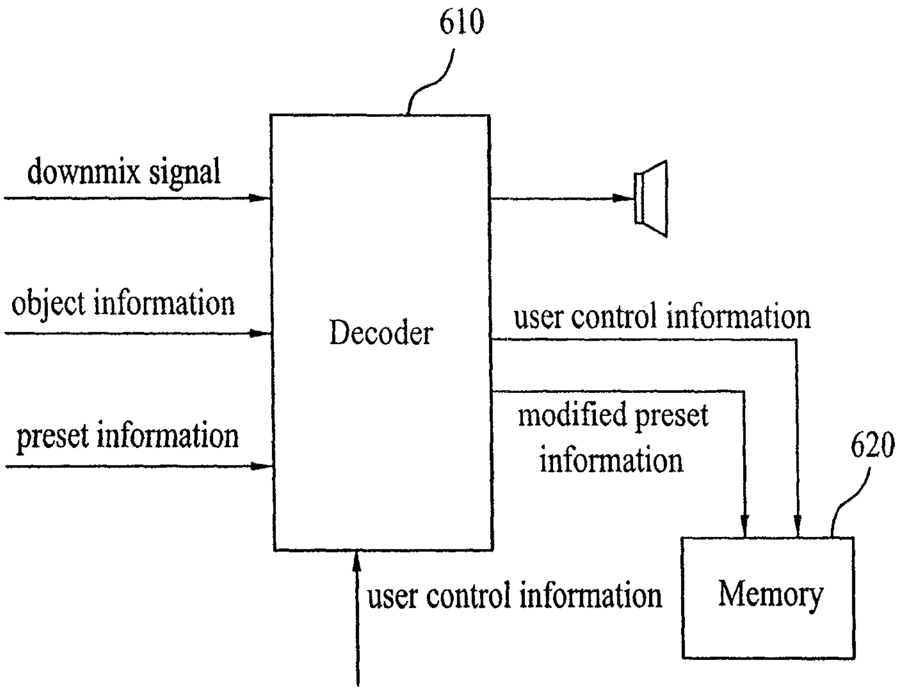
FIG. 6 is a schematic diagram of a bitstream interface of an audio signal processing apparatus including the information generating unit shown in FIG. 5.
Figure 7:
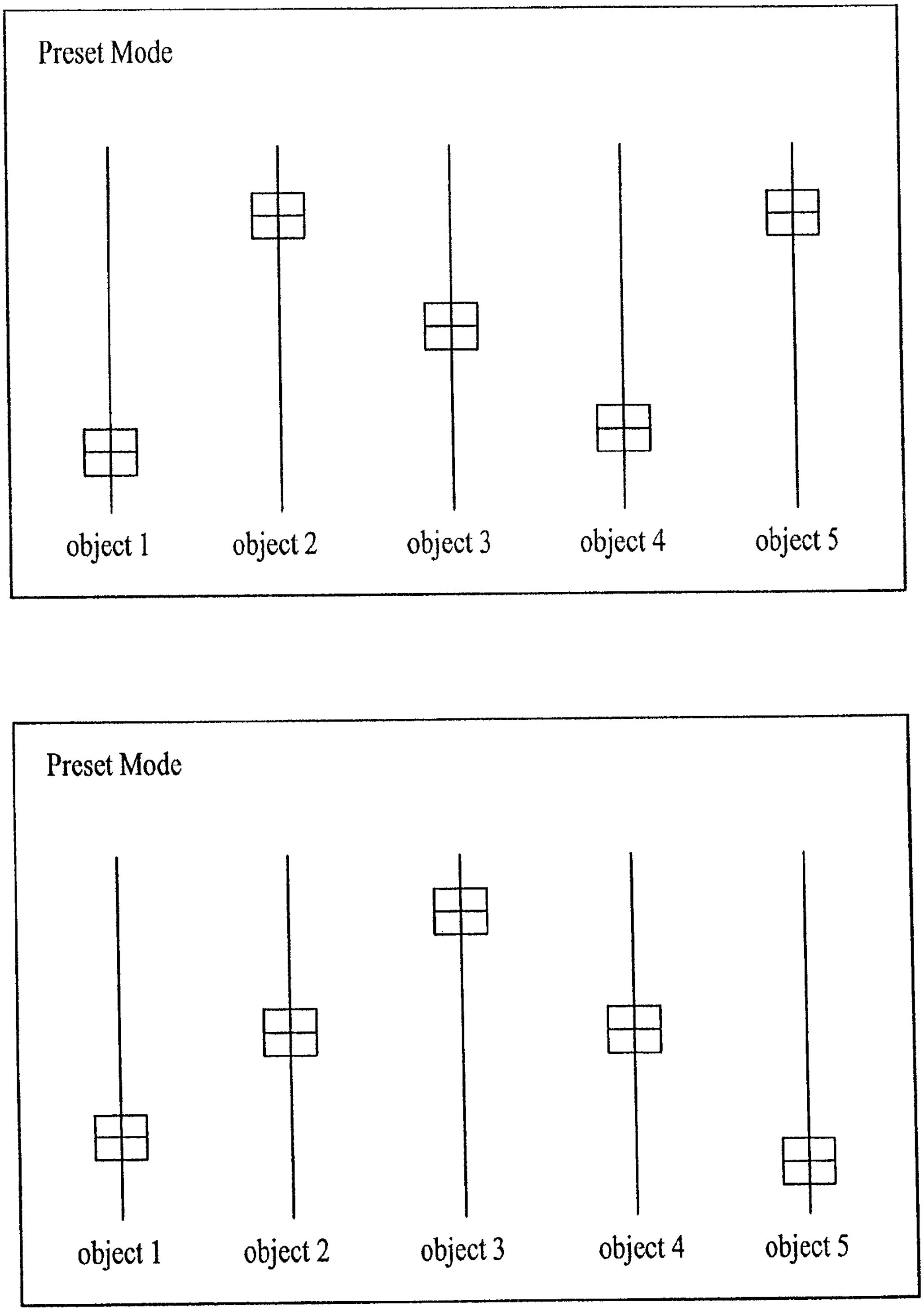
FIG. 7 is a diagram of a display of a user interface of an audio signal processing apparatus including the information generating unit shown in FIG. 5.

FIG. 5 is a block diagram of an information generating unit 110 of an audio signal processing apparatus according to another embodiment of the present invention, FIG. 6 is a schematic diagram of a bitstream interface of an audio signal processing apparatus including the information generating unit shown in FIG. 5, and FIG. 7 is a diagram of a user interface of an audio signal processing apparatus including the information generating unit shown in FIG. 5. In the following description, the respective elements and steps are explained in detail with reference to FIGS. 5 to 7.

Referring to FIG. 5, as user control information (UCI) is inputted, as shown in FIG. 3 and FIG. 4, preset information transported from an encoder is excluded and downmix processing information (DPI) and multi-channel information (MI) can be then generated using user preset information (UPI) contained in the used control information (UCI). Yet, the user control information (UCI) enables modified preset information (MPI), as shown in FIG. 5, to be generated by modifying a portion of the preset information (PI) transported from the encoder only.

The information generating unit 110, as shown in FIG. 5, comprises an information transceiving part 510, a preset information modifying part 530 and an information generating part 540 and further comprises a user interface 520 receiving user control information (UCI).

The information transceiving part 510 receives object information (OI) and preset information (PI) from a bitstream transported from an encoder. Meanwhile, the user interface 520 displays the preset information (PI) on a screen to enable a user to control a gain or panning of each object.

The preset information modifying part 530 receives the preset information (PI) from the information transceiving part 510 and is then able to generate modified preset information (MPI) using the user control information (UCI) inputted from the user interface 520. The modified preset information (MPI) may not be relevant to entire object. If the modified preset information (MPI) is relevant to partial objects, the preset information on the rest of the objects, which are not the targets of the modification, can be maintained intact without being modified in the preset information modifying part 530.

The information generating part 540 is able to generate multi-channel information (MI) using the modified preset information (MPI) and the object information (OI) received from the information transceiving part 510.

FIG. 6 is a schematic diagram of a bitstream interface of an audio signal processing apparatus including the information generating unit 110 shown in FIG. 5. According to one embodiment of the present invention, a bitstream inputted to a decoder 610 contains a downmix signal (DMX), object information (OI), preset information (PI) and user control information (UCI). And, a bitstream outputted from the decoder 610 can contain user control information (UCI), modified preset information (MPI) and a multi-channel signal (MI). The user control information (UCI) and the modified preset information (MPI) are outputted from the decoder 610 and are then able to be separately stored in a memory 620 to be reused.

Referring to FIG. 7, the preset information (PI) transported from an encoder can be displayed as a volume adjuster or a switch together with an index (e.g., object name, symbol, table corresponding to the symbol) corresponding to each object on a user interface (UI). A display part of the user interface (UI) can display modification of preset information per object corresponding to modified preset information (MPI) as the preset information (PI) is modified by user control information (UCI). In case that there are a plurality of modes represented as the provided preset information (PI), the user interface (UI) displays mode information relevant to a plurality of preset informations (PI) having been set on the display part and is then able to display the preset information (PI) of the mode corresponding to a selection made by a user.

Figure 8:
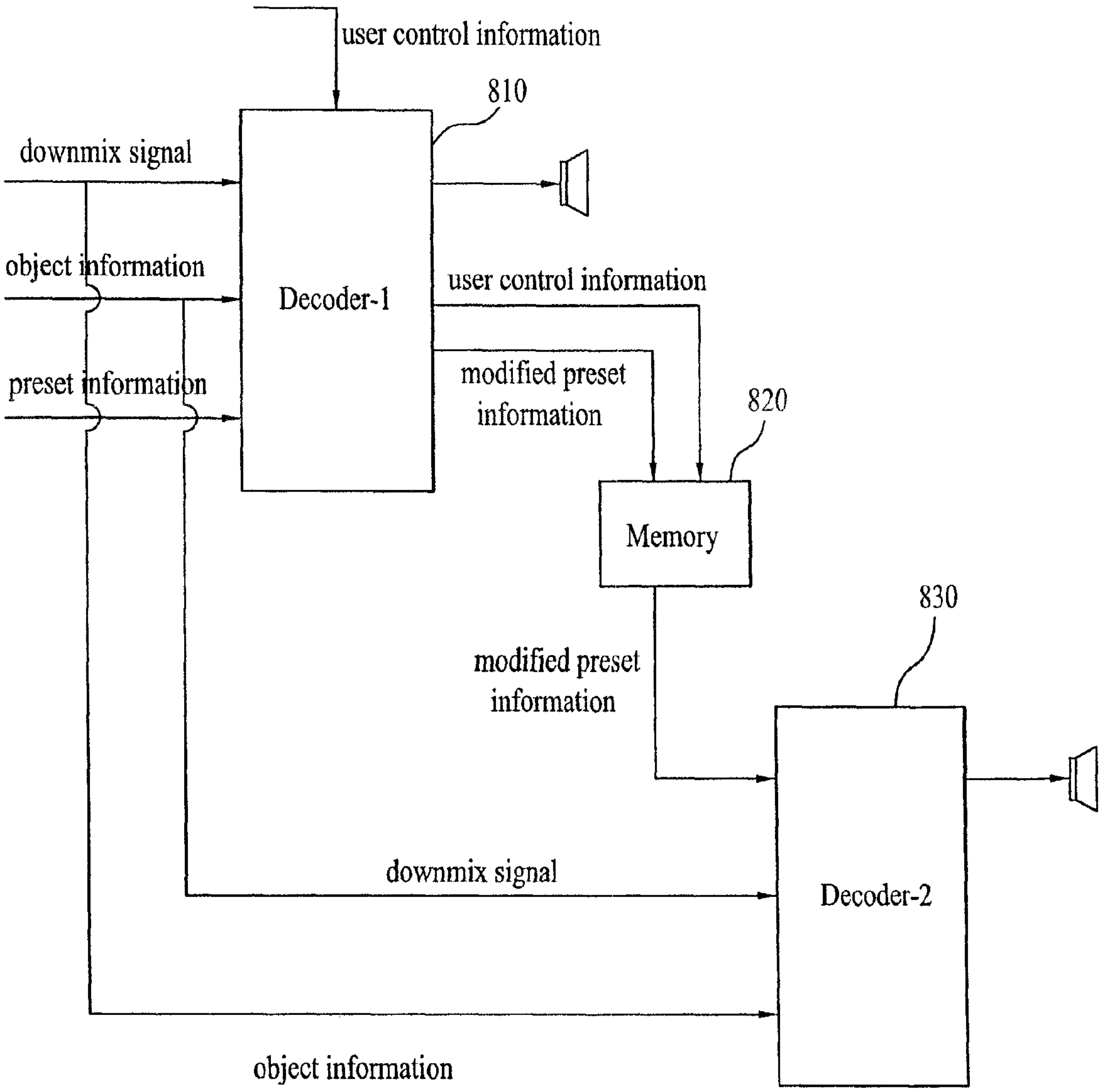
FIG. 8 is a schematic diagram of a bitstream interface of an audio signal processing apparatus according to a further embodiment of the present invention.

FIG. 8 is a schematic diagram of a bitstream interface of an audio signal processing apparatus according to a further embodiment of the present invention. A decoder-1 810 comprising the information generating unit shown in FIG. 5 receives a downmix signal (DMX), object information (OI), preset information (PI) and user control information (UCI) and is then able to output a multi-channel signal (MI), user control information (UCI) and modified preset information (MPI). The user control information (UCI) and the modified preset information (MPI) can be separately stored in a memory 820. And, a downmix signal (DMX) and object information (OI) corresponding to the modified preset information (MPI) can be inputted to a decoder-2 830. In this case, using the modified preset information (MPI) stored in the memory 820, the decoder-2 830 is able to generate a multi-channel signal identical to the former multi-channel signal generated from the decoder 1 810.

The modified preset information (MPI) can have a different value per frame. The modified preset information (MPI) can have a value common to a single music and can comprise meta information describing features or a producer. By being transported or stored separate from the multi-channel signal, the modified preset information (MPI) can be legitimately shared only.

An audio signal processing apparatus according to another embodiment of the present invention can comprise a plurality of preset informations (PI). And, a process for generating multi-channel information is explained in detail as follows.

Figure 9:
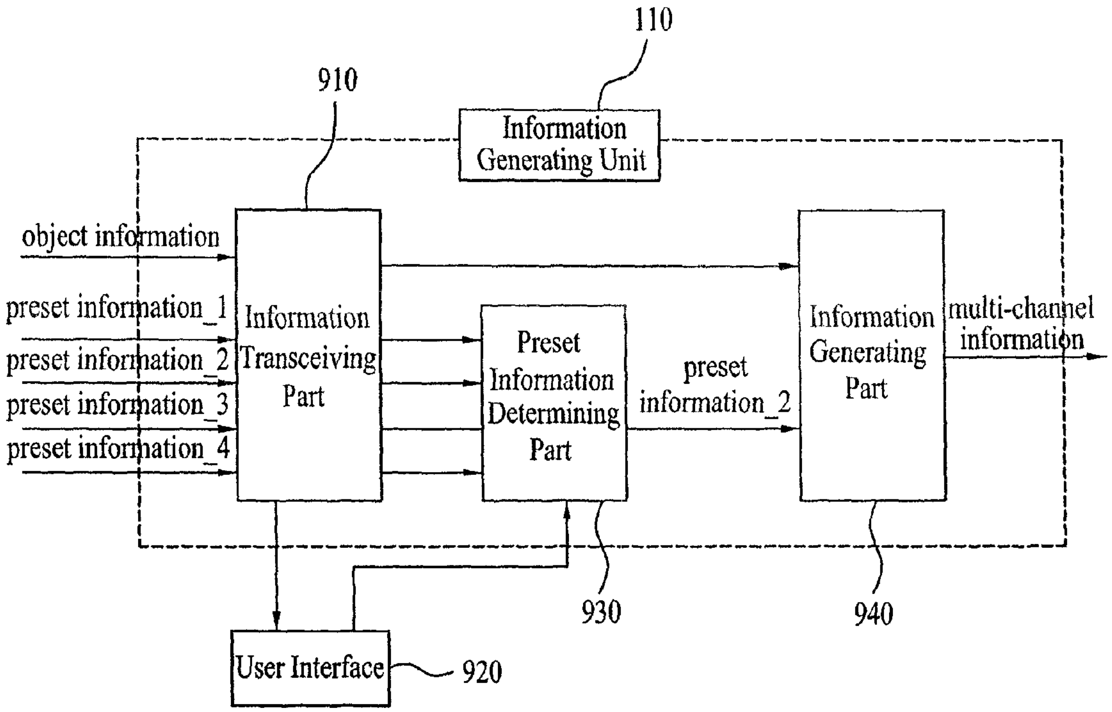
FIG. 9 is a schematic diagram of an information generating unit of an audio signal processing apparatus according to a further embodiment of the present invention.

FIG. 9 is a schematic diagram of an information generating unit of an audio signal processing apparatus according to a further embodiment of the present invention.

Referring to FIG. 9, an information generating unit 110 comprises an information transceiving part 910, a preset information determining part 930, and an information generating part 940 and also includes a user interface 920 capable of receiving user control information (UCI).

The information transceiving unit 910 receives object information (OI) and preset informations (PI_n) from a bitstream transported from an encoder. The preset informations can be configured in a plurality of preset modes such as a karaoke mode, an R&B emphasis mode, and the like.

Meanwhile, the user interface 920 displays schematic information about the preset informations (PI_n) on a screen to provide to a user and is able to receive user control information (UCI) for selecting preset information from the user.

The preset information determining part 930 is able to determine one preset information (PI) among the preset informations (PI_n) inputted from the information transceiving unit 910 using the user control information. For instance, in FIG. 9, in case that preset information_1, preset information_2, preset information_3 and preset information_4 correspond to karaoke mode, R&B emphasis mode, convert mode and acoustic mode, respectively, a mode name corresponding to each of the preset informations (PI) is displayed on the user interface 920. If a user attempts to obtain a sound stage that provides effect in wide space, the preset information_3 can be selected. The user interface 920 outputs user control information (UCI) for selecting the preset information_3 inputted from the user. The preset information determining unit 930 determined the selected preset information_3 as preset information (PI) using the user control information (UCI) and then outputs it to the information generating part 940.

The information generating part 940 is able to generate multi-channel information (MI) using the preset information (PI) received from the preset information receiving unit 930 and the object information (OI) received from the information transceiving unit 910.

An audio signal processing apparatus according to the present invention is able to adjust a gain or panning of object by selecting and applying previously set optimal preset information using a plurality of preset informations (PI) transported from an encoder and user control information (UCI) comprising preset information(PI) selected by a user, without having a gain or panning object adjusted by the user.

In the following description, if object information (OI) is not received from an encoder, a method and apparatus for processing an audio signal for decoding a downmix signal (DMX) comprising a plurality of object signals are explained in detail with reference to FIG. 10 and the like.

First of all, blind information(BI) has a concept similar to that of object information(OI). The blind information(BI) may comprise level and gain information of an object signal contained in a downmix signal in a manner that a decoder uses the downmix signal (DMX) received from an encoder and may further comprise correlation information or meta information. A process for generating blind information (BI) is explained in detail as follows.

Figure 10A:
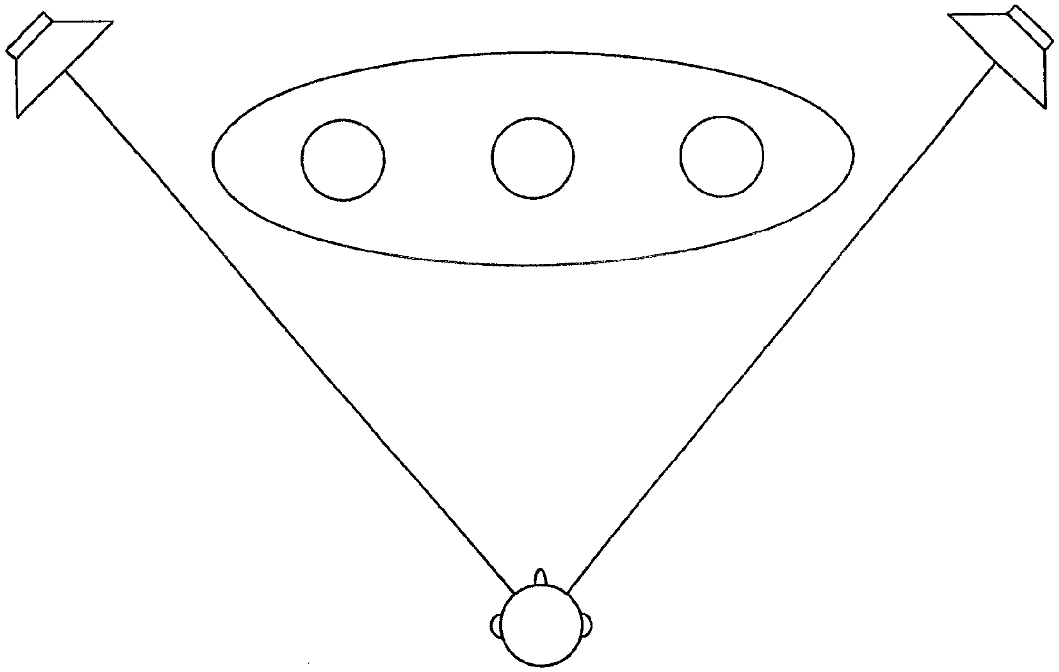
FIG. 10A and FIG. 10B are schematic diagrams of an output signal of an audio signal processing method according to another embodiment of the present invention.
Figure 10B:
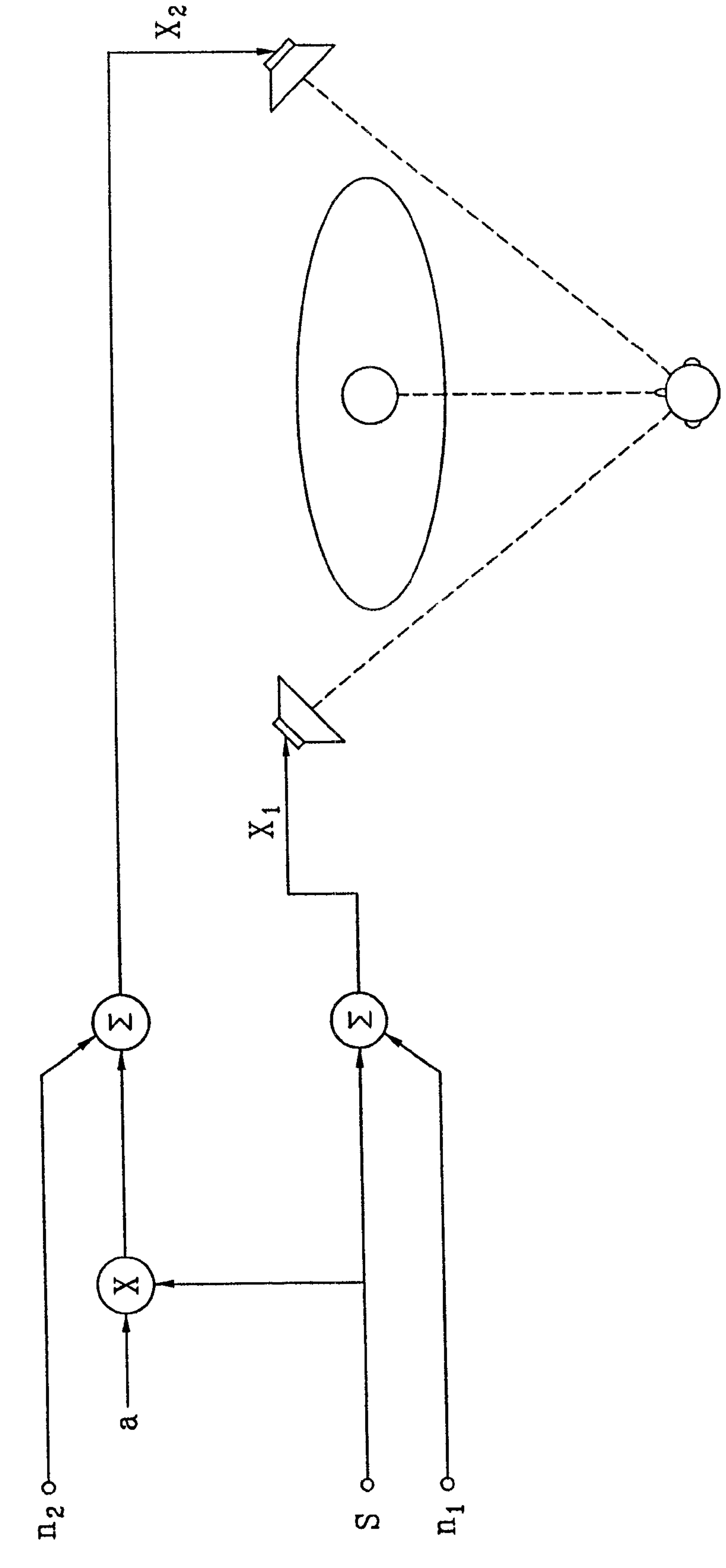

FIG. 10A and FIG. 10B are schematic diagrams for an audio signal processing method for generating blind information using position information of an output signal.

Referring to FIG. 10A, in case of using an output device having stereo channels, a listener receives an audio signal (DMX) from left and right channels. If the audio signal comprises a plurality of object signals, each object signal may differ in area occupied in space according to gain information contributed to the left or right channel.

FIG. 10B shows a configuration of a signal outputted from each stereo signal to generate a single object signal among object signals discriminated from each other according to a position area. In FIG. 10B, an object signal s indicates a signal located in a direction determined by a gain factor a and independent object signals $n_1$ and $n_2$ indicate peripheral signals for the signal s. The object signal can be outputted to a stereo channel with specific direction information. And, the direction information may comprise level difference information, time difference information or the like. Besides, the peripheral signal can be determined by a playback configuration, a width that is aurally sensed, or the like. The stereo output signal shown in FIG. 10B can be represented as Formula 1 using the object signal s, the peripheral signals $n_1$ and $n_2$ and the gain factor a for determining a direction of object signal.

$$x_1(n)=s(n)+n_1(n)$$

$$x_2(n)=as(n)+n_2(n) \quad \text{[Formula 1]}$$

In order to get a decomposition which in not only effective in a one auditory event scenario, but non-stationary downmix signal(DMX) comprising multiple concurrently active sources, the Formula 1 needs to be analyzed independently in a number of frequency bands and adaptively in time. If so, $x_1(n)$ and $x_2(n)$ can be represented as follows.

$$X_1(i,k)=S(i,k)+N_1(i,k)$$

$$X_2(i,k)=A(i,k)S(i,k)+N_2(i,k) \quad \text{[Formula 2]}$$

where 'i' is the frequency band index and 'k' is the time band index.

Figure 11:
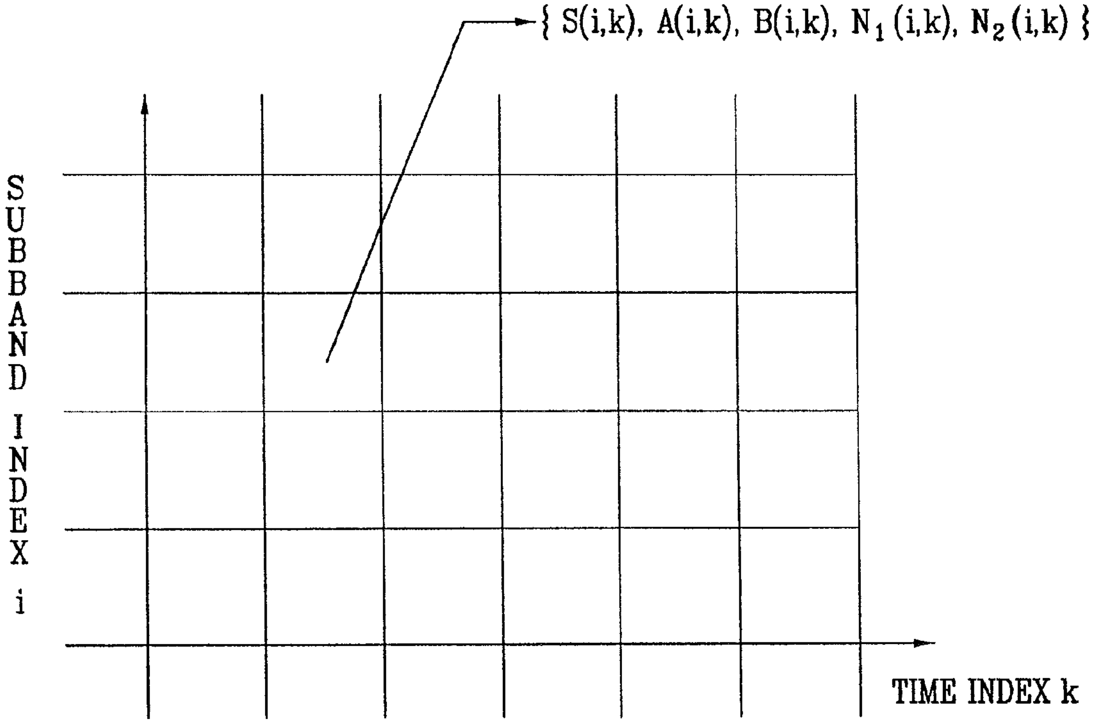
FIG. 11 is a graph of time-frequency domain for analyzing a stereo output signal according to another embodiment of the present invention.

FIG. 11 is a graph of time-frequency domain for analyzing a stereo output signal according to another embodiment of the present invention. Each time-frequency domain includes index I and index k. And, object signal S, peripheral signals $N_1$ and $N_2$ and gain factor A can be independently estimated. In the following description, the frequency band index I and the time band index k shall be ignored in the following.

Bandwidth of a frequency band for the analysis of downmix signal (DMX) can be selected to be identical to a specific band and can be determined according to characteristics of the downmix signal (DMX). In each frequency band, S, $N_1$, $N_2$ and A can be estimated each millisecond t. In case that $X_1$ and $X_2$ are given as downmix signals (DMX), estimated vales of S, $N_1$, $N_2$ and A can be determined by the analysis per time-frequency domain. And. A short-time estimate of the power of $X_1$ can be estimated as Formula 3.

$$P_{X1}(i,k)=E\{X_1^2(i,k)\} \quad \text{[Formula 3]}$$

where E{.} is a short-time averaging operation.

For the other signals, the same convention is used, i.e. PX2, PS, and PN=PN1=PN2 are the corresponding short-time power estimates. The power of $N_1$ and $N_2$ is assumed to be the same, i.e. it is assumed that the amount of power of lateral independent sound is the same for left and right channels of stereo channels.

Given the time-frequency band representation of the downmix signal(DMX), the power($P_{X1}$, $P_{X2}$) and the normalized cross-correlation are computed. The normalized cross-correlation between left and right can be represented as Formula 4.

$$\phi(i,k)=\frac{E\{X_1(i,k)X_2(i,k)\}}{\sqrt{E\{X_1^2(i,k)E\{X_2^2(i,k)\}}} \quad \text{[Formula 4]}$$

Gain information (A), object signal power ($P_S$), peripheral signal power ($P_N$) are computed as a function of the estimated $P_{X1}$, $P_{X2}$, and normalized cross-correlation (ϕ). Three equations relating the known and unknown variables are represented as Formula 5.

$$P_{X1}=P_S+P_N \quad \text{[Formula 5]}$$

-continued $$P_{X2}=A^2P_S+P_N$$

$$\phi=\frac{AP_S}{\sqrt{P_{X1}P_{X2}}}$$

Formula 5 is summarized for A, $P_S$ and $P_N$ into Formula 6.

$$A=\frac{B}{2C} \quad \text{[Formla 6]}$$

$$P_S=\frac{2C^2}{B}$$

$$P_N=X_1-\frac{2C^2}{B}$$

$$\left(B=P_{X2}-P_{X1}+\sqrt{(P_{X1}-P_{X2})^2+4P_{X1}P_{X2}\phi^2},\ C=\phi\sqrt{P_{X1}P_{X2}}\right)$$

Figure 12A:
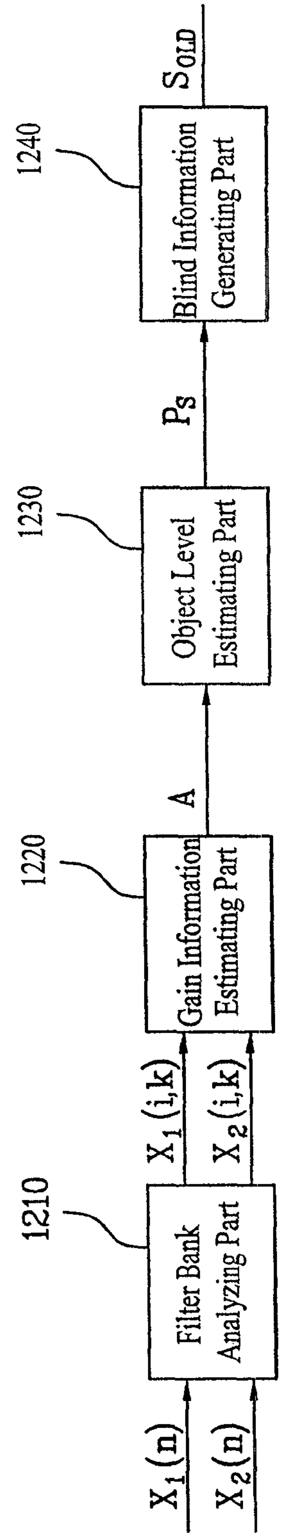
FIG. 12A and FIG. 12B are block diagram and flowchart of a process for generating blind information according to another embodiment of the present invention.
Figure 12B:
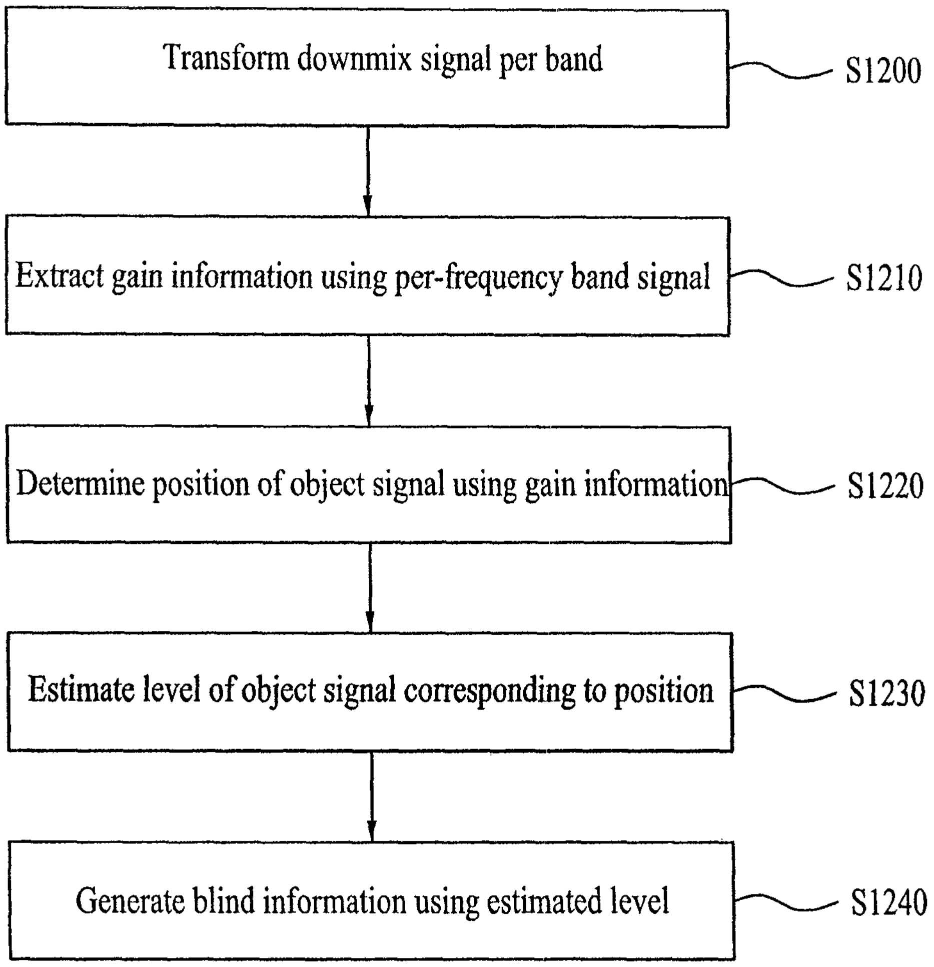

FIG. 12A and FIG. 12B are block diagram and flowchart of a process for generating blind information (BI) from a downmix signal (DMX) transported from an encoder. First of all, downmix signals ($x_1(n)$,$x_2(n)$) having stereo channels are inputted to a filter bank analyzing part 1210 and then transformed into per-time-frequency domain signals ($x_1(i,k)$,$x_2(i,k)$) [S1200]. The transformed downmix signals ($x_1(i,k)$,$x_2(i,k)$) are inputted to a gain information estimating part 1220. The gain information estimating part 1220 analyzes the converted downmix signals ($x_1(i,k)$,$x_2(i,k)$), estimates gain information (A) of object signal [S1210], and determines a position of the object signal in a downmix output signal [S1220]. In this case, the estimated gain information (A) indicates an extent that the object signal contained in the downmix signal contributes to the stereo channel of the downmix output signal, decides a signal existing at a different position in case of outputting the downmix signal as a separate object signal, and assumes that a single object signal has one gain information. An object level estimating part 1230 estimates a level ($P_s$) of object signal corresponding to each position using position information of the gain information (A) outputted from the gain information estimating part 1220 [S1230]. And, a blind information generating part 1240 generates blind information ($S_{OLD}$) (BI) using the gain information and the level of the object signal [31240].

The blind information (BI) can further comprise blind correlation information (BCI) and blind gain information (BGI). The blind correlation information (BCI) indicates correlation between two objects and can be generated using the estimated gain information and the level of the object signal.

Figure 13:
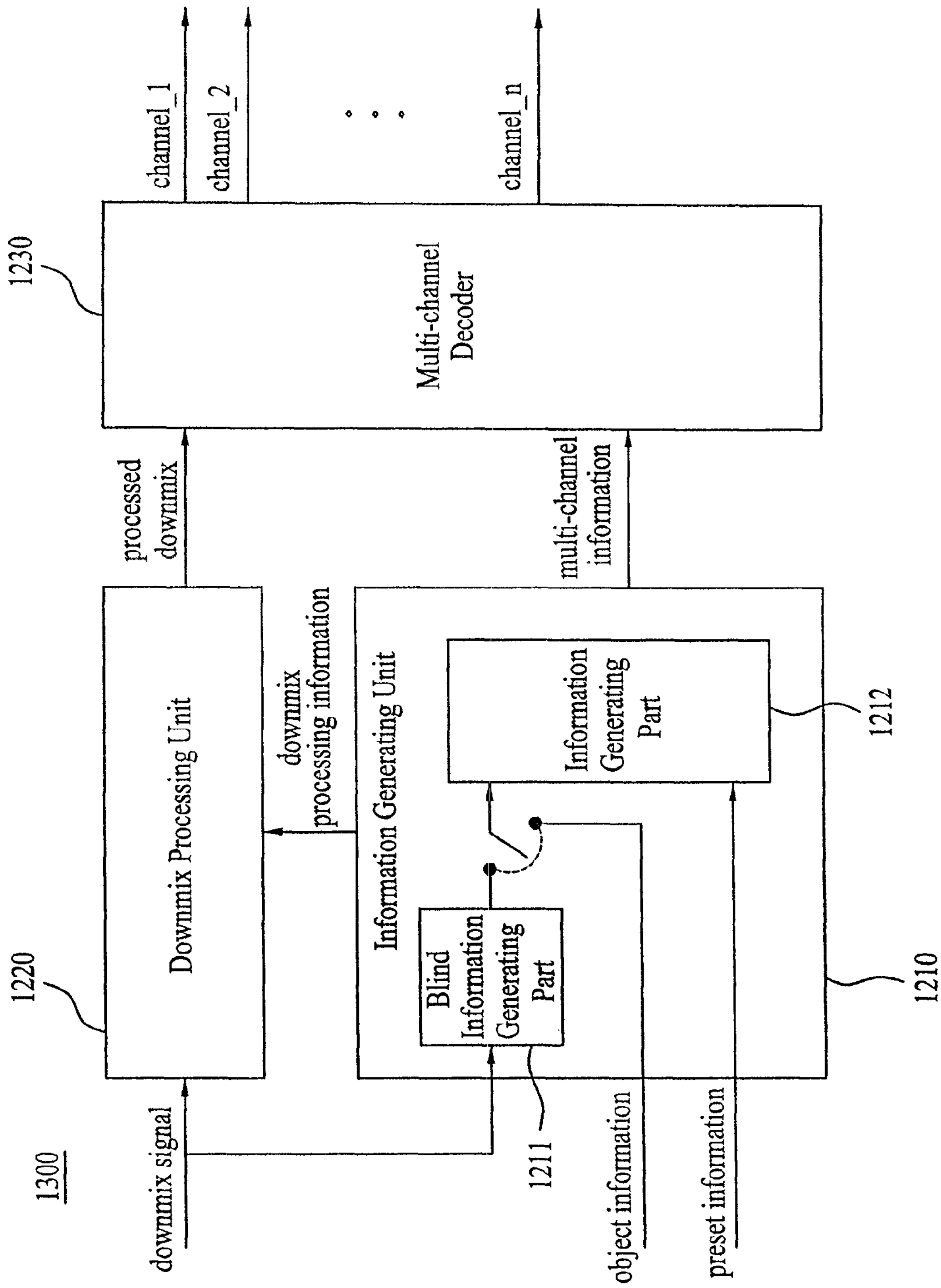
FIG. 13 is a block diagram of an audio signal processing apparatus according to another embodiment of the present invention.

FIG. 13 is a block diagram of an audio signal processing apparatus according to one embodiment of the present invention. An audio signal processing apparatus 1300 according to one embodiment of the present invention comprises an information generating unit 1210, a downmixing processing unit 1220, and a multi-channel decoder 1230. The downmix processing unit 1220 and the multi-channel decoder 1230 have the same configurations and roles of the former downmix processing unit 120 and the multi-channel decoder 130 shown in FIG. 1. So, their details will be omitted in the following description.

Referring to FIG. 13, the information generating unit 1210 receives a downmix signal (DMX), object information (OI) and preset information (PI) from an encoder and then generated downmix processing information (DPI) and multi-channel information (MI). The information generating unit 1210 mainly includes a blind information generating part 1211 and an information generating part 1212.

If the object information (OI) is transported from the encoder, the blind information generating part 1211 does not generate blind information (BI) and, as mentioned in the foregoing description of FIG. 1, the information generating part 1212 generates downmix processing information and multi-channel information using the transported object information (OI).

If the object information (OI) is not transported to the information generating unit 1210, as mentioned in the foregoing descriptions of FIGS. 11 to 12B, the blind information generating part 1211 receives a downmix signal (DMX), transforms it into per-time-frequency domain signals ($x_1(i,k)$, $x_2(i,k)$), recognizes a signal located at a separate position as a single object signal from the transformed downmix signal, estimates gain information (A) of the object signal, and then generates blind information (BI, $S_{OLD}$) by estimating a level of the object signal using the gain information (A).

Figure 14:
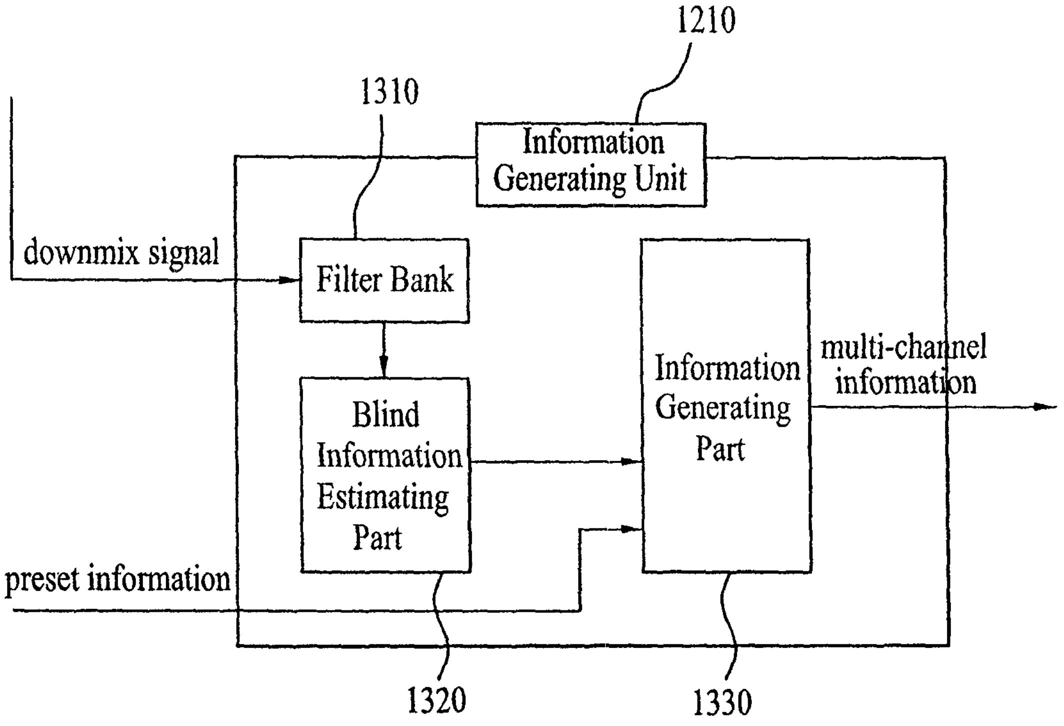
FIG. 14 is a detailed block diagram of an information generating unit including a blind information generating part shown according to another embodiment of the present invention.

FIG. 14 is a detailed block diagram of the information generating unit 1210 including the blind information generating part 1211.

Referring to FIG. 14, the information generating unit 1210 mainly comprises a filter bank 1310, a blind information estimating part 1320, and an information generating part 1330. The filter bank 1310 transforms a downmix signal into per-time-frequency domain signals to enable analysis for generating blind information (BI). The downmix signal (DMX) transformed into the per-time-frequency domain signals ($x_1(i,k)$,$x_2(i,k)$) by the filter bank 1310 is inputted to the blind information estimating part 1320. And, blind information ($S_{OLD}$) for decoding of the downmix signal (DMX) is generated using position information, gain information (A) of object signal and level ($P_s$) of object signal. Meanwhile, the information generating part 1330 generates multi-channel information using the blind information (BI) ($S_{OLD}$) and the preset information (PI).

Figure 15:
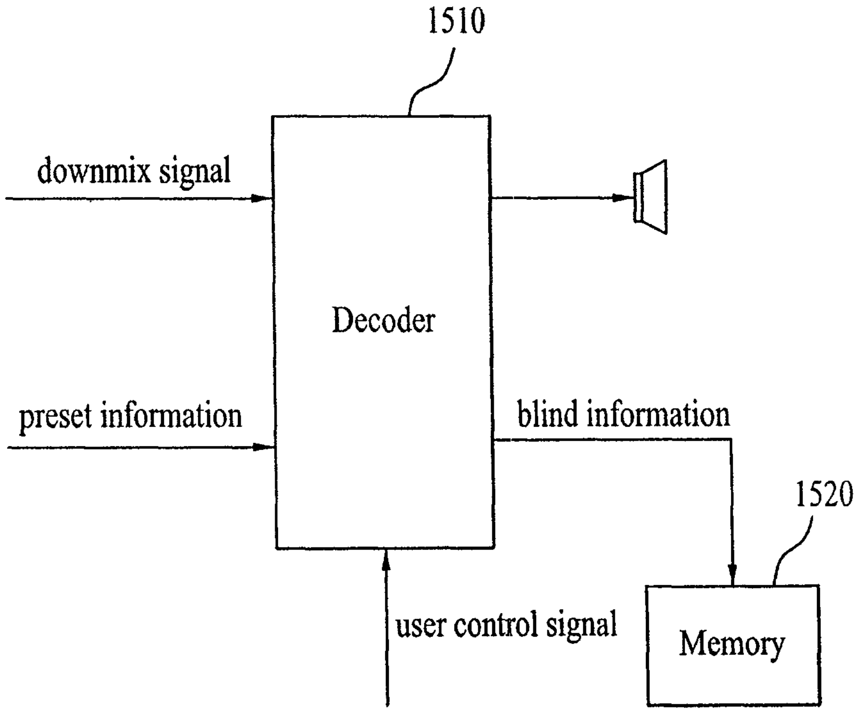
FIG. 15 is a schematic diagram of a bitstream interface of an audio signal processing apparatus including the information generating unit shown in FIG. 14 according to another embodiment of the present invention.

FIG. 15 is a schematic diagram of a bitstream interface of an audio signal processing apparatus including the information generating unit shown in FIG. 14. According to one embodiment of the present invention, a bitstream inputted to a decoder 1510 contains a downmix signal (DMX), preset information (PI), and user control information (UCI). In this case, the user control information (UCI) can be user preset information (UPI) used instead of not using preset information (PI) transported from an encoder or may correspond to control information (UCI) for modifying preset information (PI) in part. Object signal (OI) is not inputted thereto. And, a blind information generating part (not shown in the drawing) is included within the decoder 1510. Bitstream outputted from the decoder 1510 can contain a multi-channel signal (MI) and blind information (BI). The blind information (BI) is outputted from the decoder 1510 and the separately stored in a memory 1520 for reuse.

Figure 16:
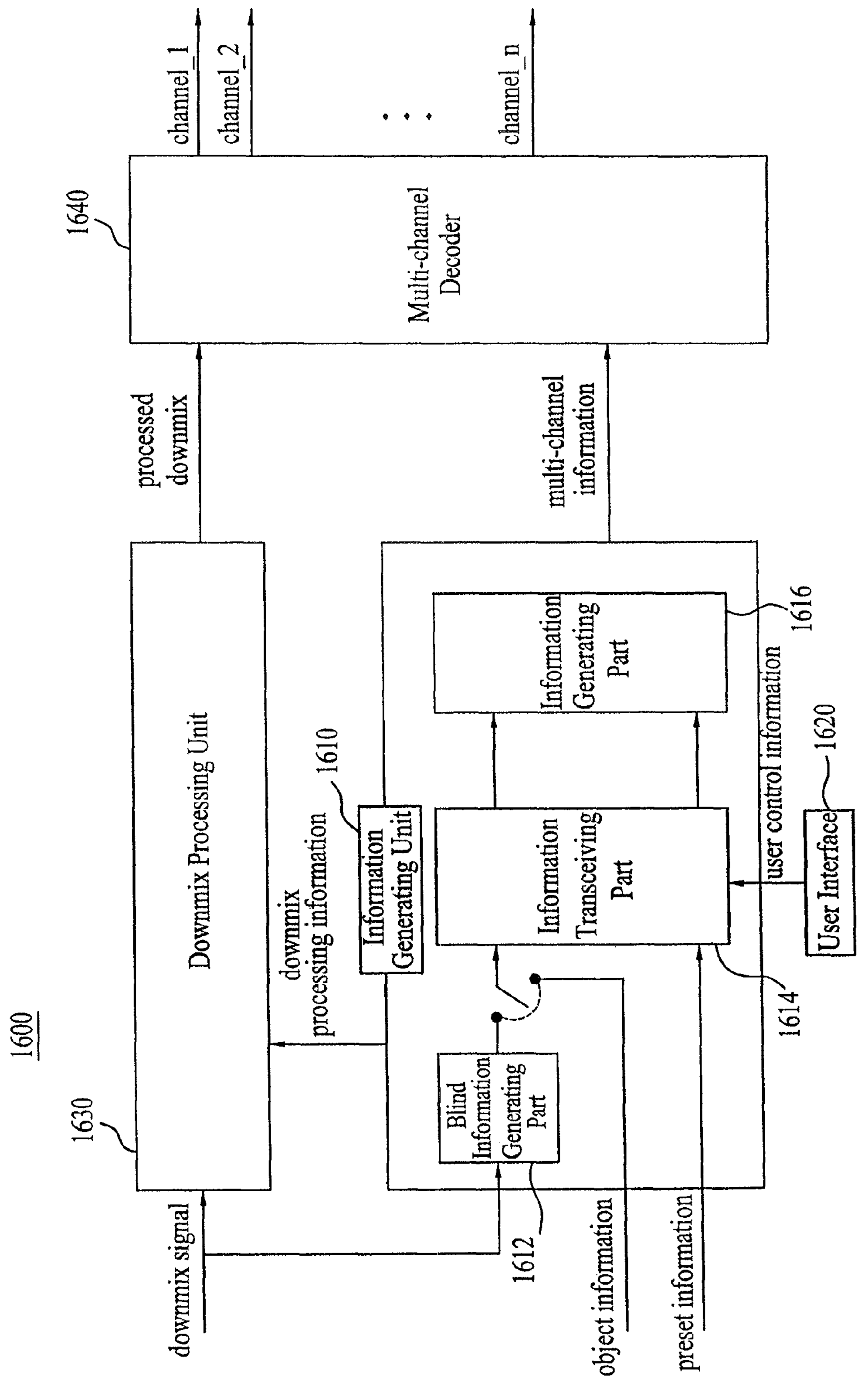
FIG. 16 is a block diagram of an audio signal processing apparatus according to a further embodiment of the present invention.

FIG. 16 is a block diagram of an audio signal processing apparatus 1600 according to a further embodiment of the present invention.

Referring to FIG. 16, an audio signal processing apparatus 1600 according to the present invention includes an information generating unit 1610, a user interface 1620, a downmix processing unit 1630, and a multi-channel decoder 1640.

The information generating unit 1610 comprises a blind information generating part 1612, an information transceiving part 1614, and an information generating part 1616. In case of not receiving object information (OI) from an encoder, the blind information generating part 1612 generates blind information (BI) using a downmix signal (DMX). Meanwhile, the information transceiving part 1614 receives blind information (BI) or object information (OI) and receives user control information (UCI) from the user interface 1620 and preset information (PI) from the encoder. The information generating part 1616 generates multi-channel information (MI) and downmix processing information (DPI) using the preset information (PI), user control information (UCI) and blind information (BI) (or object information (OI)) received from the information transceiving unit 1614.

The downmix processing unit 1630 generates a processed downmix signal (PDMX) using the downmix signal (DMX) received from the encoder and the downmix processing information (DPI) received from the information generating unit. And, the multi-channel decoder 1640 generates multi-channel signals channel_1, channel_2, and channel_n using the processed downmix (PDMX) and the multi-channel information (MI).

Accordingly, the audio signal processing method and apparatus according to another embodiment of the present invention generates blind information (BI) despite not receiving object information (OI) from an encoder and is facilitated to adjust a gain and panning of object signal in various modes using preset information (PI).

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Accordingly, the present invention is applicable to a process for encoding/decoding an audio signal.

What is claimed is:

1. A method of processing an audio signal, comprising:

receiving a downmix signal comprising plural objects and a bitstream including object information and preset information, the bitstream received from an encoding device, wherein the preset information is information for controlling a gain or panning of each of the plural objects;

generating downmix processing information using the object information and the preset information;

processing the downmix signal using the downmix processing information; and generating multi-channel information using the object information and the preset information, wherein the object information comprises at least one selected from the group consisting of object level information, object correlation information and object gain information, wherein the object level information is generated by normalizing an object level corresponding to an object using one of object levels, wherein the object correlation information is generated from combination of two selected objects, wherein the object gain information is for determining contributiveness of the object for a channel of each downmix signal to generate the downmix signal, wherein the preset information is extracted from the bitstream, wherein the method further includes generating blind information using the downmix signal when the bitstream does not include the object information, wherein the blind information includes blind correlation information and blind gain information, wherein the blind correlation information and blind gain information are generated by estimating a gain and a level of the plural objects, and wherein the blind correlation information indicates a correlation between two objects.

2. The method of claim 1, wherein the preset information is extracted from the bitstream separate from at least one selected from the group consisting of the downmix signal and the object information.

3. The method of claim 1, wherein the preset information comprises a gain factor per object.

4. The method of claim 3, wherein the gain factor varies according to a time.

5. The method of claim 1, further comprising:

receiving user control information for modifying or selecting the preset information.

6. The method of claim 5, wherein the user control information selects to use the preset information.

7. The method of claim 6, further comprising if the preset information is not used:

receiving user preset information from a user;

processing the downmix signal using the object information and the user preset information; and generating the multi-channel information using the object information and the preset information.

8. The method of claim 5, further comprising:

generating modified preset information by receiving the user control information;

outputting the modified preset information; and storing the modified preset information.

9. The method of claim 8, wherein if the modified preset information is relevant to partial objects, the preset information on the rest of the objects is not modified.

10. The method of claim 8, further comprising:

displaying a fact that the preset information is modified per the object.

11. The method of claim 1, further comprising if there exist at least two preset information:

receiving selection information, wherein generating the multi-channel information uses the selected preset information.

12. The method of claim 1, further comprising:

receiving meta information corresponding to the preset information; and displaying the meta information on a user interface.

13. A tangible, non-transitory computer-readable recording medium, comprising a program recorded therein, the program provided for executing the steps described in claim 1.

14. An apparatus for processing an audio signal, comprising:

an information transceiving unit receiving a downmix signal comprising plural objects and a bitstream including object information and preset information, wherein the preset information is information for controlling a gain or panning of each of the plural objects;

a downmix processing information generating unit generating downmix processing information using the object information and the preset information;

a downmix signal processing unit processing the downmix signal using the downmix processing information;

a multi-channel generating unit generating multi-channel information using the object information and the preset information; and a blind information generating unit configured to generate blind information using the downmix signal when the bitstream does not include the object information, wherein the blind information includes blind correlation information and blind gain information, wherein the blind correlation information and blind gain information are generated by estimating a gain and a level of the plural objects, and wherein the blind correlation information indicates a correlation between two objects.

* * * * *